United States Patent
Harms (10) Patent No.: US 10,248,151 B2
(45) Date of Patent: Apr. 2, 2019

(54) SEAMLESS BUTTON

(71) Applicant: Ableton AG, Berlin (DE)

(72) Inventor: Oliver Harms, Bestensee (DE)

(73) Assignee: Ableton AG, Berlin (DE)

(*) Notice: Subject to any disclaimer, the term of this patent is extended or adjusted under 35 U.S.C. 154(b) by 0 days.

(21) Appl. No.: 15/234,153

(22) Filed: Aug. 11, 2016

(65) Prior Publication Data

US 2017/0045908 A1    Feb. 16, 2017

(30) Foreign Application Priority Data

Aug. 12, 2015   (EP) .................................... 15180732

(51) Int. Cl.
  *H01H 13/705*   (2006.01)
  *G05G 1/02*   (2006.01)
  (Continued)

(52) U.S. Cl.
  CPC .............. *G05G 1/025* (2013.01); *B29D 19/00* (2013.01); *G05G 25/00* (2013.01); *H01H 13/06* (2013.01); *H01H 13/705* (2013.01); *B29K 2069/00* (2013.01); *B29K 2083/00* (2013.01); *H01H 2215/006* (2013.01); *H01H 2219/064* (2013.01); *H01H 2221/002* (2013.01); *H01H 2221/03* (2013.01); *H01H 2221/074* (2013.01); *H01H 2223/002* (2013.01); *H01H 2223/054* (2013.01);
  (Continued)

(58) Field of Classification Search
  CPC ................. H01H 13/023; H01H 13/10; H01H 2221/044; H01H 2221/042; H01H 2221/064; H01H 2221/07; H01H 2221/0702; H01H 13/06

USPC .................................................. 200/5 R, 18
  See application file for complete search history.

(56) References Cited

U.S. PATENT DOCUMENTS 5,573,107 A * 11/1996 Nakano ................ H01H 13/702
                                                          200/311
6,225,579 B1 * 5/2001 Ritter ................... H01H 25/041
                                                          200/18
(Continued)

FOREIGN PATENT DOCUMENTS

DE   10 2004 033972 B4   6/2008
DE   10 2011 001813 A1   10/2012
JP        2008305694 A   12/2008

OTHER PUBLICATIONS

European Search Report prepared by the European Patent Office for EP 15180732, dated Dec. 14, 2015, 1 page.

*Primary Examiner* — Felix O Figueroa
(74) *Attorney, Agent, or Firm* — Chernoff Vilhauer LLP (57) ABSTRACT

A seamless button including a guiding element, a movable actuating element and a switch located on a mounting plate. The movable actuating element is made of elastic material with a massive middle shaft spaced from the inner walls of the chamber by an air gap. It has an upper actuating surface and crimp surrounding the actuating surface above the air gap. It also has a profile area at the outer circumference of the movement crimp, where the horizontally outwardly extending portion of the profile area rests on top of the outer wall, the downwardly extending portion of the profile area rests on the outside of the outer profile edge and the protrusion rests on the pedestal covering it at least partially. A seamless multi-button is also disclosed, with a method for manufacturing seamless buttons.

15 Claims, 5 Drawing Sheets

(51) Int. Cl.
  *H01H 13/06* (2006.01)
  *B29D 19/00* (2006.01)
  *G05G 25/00* (2006.01)
  *B29K 69/00* (2006.01)
  *B29K 83/00* (2006.01)

(52) U.S. Cl.
  CPC . *H01H 2229/048* (2013.01); *H01H 2233/046* (2013.01)

(56) References Cited

U.S. PATENT DOCUMENTS

| | | | | |
|---|---|---|---|---|
| 6,844,511 | B1 * | 1/2005 | Hsu | H01H 25/041 |
| | | | | 200/5 R |
| 8,404,988 | B2 * | 3/2013 | Cheng | H01H 13/52 |
| | | | | 200/341 |
| 8,513,556 | B2 * | 8/2013 | Kitahara | H01H 13/06 |
| | | | | 200/341 |
| 8,946,575 | B2 * | 2/2015 | Kikuchi | H01H 13/063 |
| | | | | 200/302.2 |

* cited by examiner

SEAMLESS BUTTON

CROSS-REFERENCE TO RELATED APPLICATION

This application claims priority of European Patent Application No. 15 180 732.8 filed Aug. 12, 2015.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

Not applicable.

FIELD OF THE INVENTION

The present invention relates to a seamless button and a seamless multi-button the single regions of which can be actuated individually.

BACKGROUND OF THE INVENTION

Buttons can be found in various realms of technology, e.g. computers, automobiles, musical instruments and many more. Yet, there is a general problem with conventional buttons, namely the presence of a gap between the actual button and the device in which it is embedded. On the one hand, the gap provides for the mobility of the button, on the other hand, it can often become dirty or even cause a total operational failure if, for instance, a liquid enters the gap damaging the electronics possibly lying directly underneath. Moreover, the gap allows light to permeate and, thus, buttons—which cannot be illuminated individually—cannot be clearly separated from one another as far as the illumination is concerned. Several attempts have been made to minimize the problems caused by the gap. Such as WO 2007/053966 A1 which discloses an integrated button that can at least be partially embedded in a unit the surface of which is coated with a surface material in the area of the button. The button is placed in a cutout of the surface material and is comprised of a primary part essentially placed inside the unit and a secondary part designated as a key button to trigger a function. In certain areas the key button covers a section of the surface material and is connected thereto in a force-fit and/or form-fit manner such that a lightproof separation of individual buttons is not possible.

DE 196 340 51 C1 discloses a switch arrangement for an electrical device with a button. Activation of the button results in moving a tappet guided within a carrier into an actuating direction in such a way that a contact element lying in the actuating direction is activated. Button and tappet can be displaced along contact areas arranged opposite to each other orthogonal to the activation area, and both parts are movable independently from the displacement in the actuating direction. Nevertheless, there is a gap around the button which causes the above mentioned problems.

DE 10 2004 033 974 B4 discloses a control panel with several control elements, wherein the bottom side of the control elements is furnished with elastic sealing means made of plastic archedly extending from the bottom side opposite of the control element's control side to the adjacent control elements. In this arrangement there is a gap between a control element and the elastic plastic sealing means, too, causing the abovementioned problems.

Hence, there continues to be a need for a button which overcomes the problems caused by the gap between the button and the device in which it is embedded.

BRIEF SUMMARY OF THE INVENTION

Thus, it is one of the objectives of the present invention to provide a button avoiding gap-typical drawbacks of its function caused, for instance, by residues entering the gap between the button and the device. Moreover, it is an objective of the present invention to provide a button with improved illumination potential by preventing the dispersion of light.

According to the present invention, this has been achieved by a button comprising a guiding element, a movable actuating element and a switch which is located on a mounting plate, characterized in that the guiding element includes a rigid outer wall which forms an inner chamber with a bottom opening and a top opening and which is provided on its outer side in the upper area with an inwardly offset outer profile edge and with a pedestal extending horizontally and forming the transition between the upper outer profile edge and the remaining part of the outer wall; the movable actuating element is made of elastic material and provided with a massive middle shaft spaced from the inner walls of the chamber by an air gap and having an upper actuating surface, with a movement crimp surrounding the actuating surface above the air gap, and with a profile area arranged at the outer circumference of the movement crimp and extending firstly horizontally outwardly and then downwardly and ending in a horizontally outwardly extending protrusion; wherein the horizontally outwardly extending portion of the profile area rests on top of the outer wall, the downwardly extending portion of the profile area rests on the outside of the outer profile edge and the protrusion rests on the pedestal covering it at least partially.

The method for manufacturing the buttons of the present invention is characterized by the following steps: molding guiding elements of a rigid material which have an outer wall which forms an inner chamber with a bottom opening and a top opening and which is provided on its outer side in the upper area with an inwardly offset outer profile edge and with a pedestal extending horizontally and forming the transition between the upper outer profile edge and the remaining part of the outer wall; molding button elements made from an elastic material into the guiding elements in a molding tool which is provided with protrusions such that the button elements each have a massive middle shaft spaced from the inner walls of the chamber by an air gap due to the recesses inside the molding tool and having an upper actuating surface, a movement crimp surrounding the actuating surface above the air gap, and a profile area arranged at the outer circumference of the movement crimp and extending firstly horizontally outwardly and then downwardly and ending in a horizontally outwardly extending protrusion, wherein the horizontally outwardly extending portion of the profile area adheres to the outer wall, the downwardly extending portion of the profile area adheres to the outside of the outer profile edge and the protrusion rests on the pedestal covering it at least partially and adheres thereto such that the guiding elements and the button elements are united to adhering button parts in these areas, wherein the shaft is movable due to the air gap inside the chamber; removing the adhering button parts from the molding tool; inserting the adhering button parts into a mounting plate which is provided with switches actuable by the button parts.

Other advantageous features of the button of the present invention and its manufacturing process are disclosed, e.g. a multi-button, the individual parts of which are installed completely seamless adjacent to each other but are nevertheless individually actuable.

DETAILED DESCRIPTION OF THE INVENTION

As mentioned above, conventional buttons have a gap between the actual button and the device in which they are embedded which, the one hand, ensures the movability of the button but, on the other hand, entails several disadvantages such as dirt build-up, light permeation etc.

Figure 1:
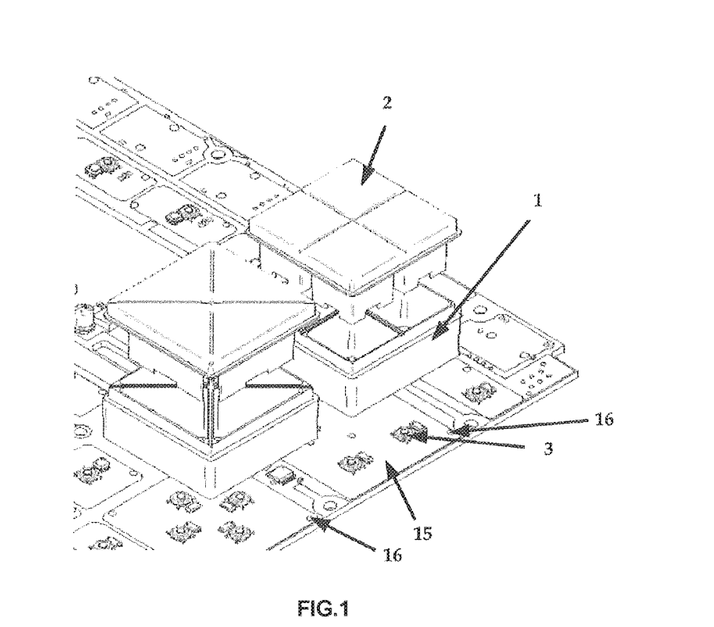
FIG. 1 is an exploded view of two buttons of the present invention.

The present invention overcomes these problems by providing seamless buttons. The button construction of the present invention is generally comprised of three main components which are shown in FIG. 1, namely a rigid button body 1, an elastic button element 2 molded into the former and a switch 3 which can be arranged on a mounting plate 15, e.g. a circuit board (PCB).

Figure 2:
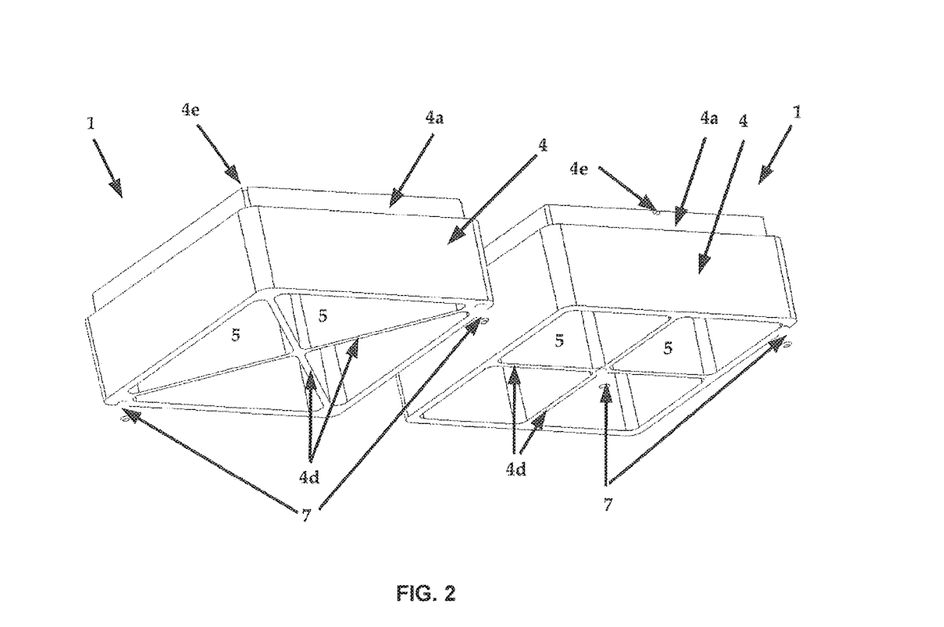
FIG. 2 is a perspective view from below of two button bodies of the present invention.
Figure 6:
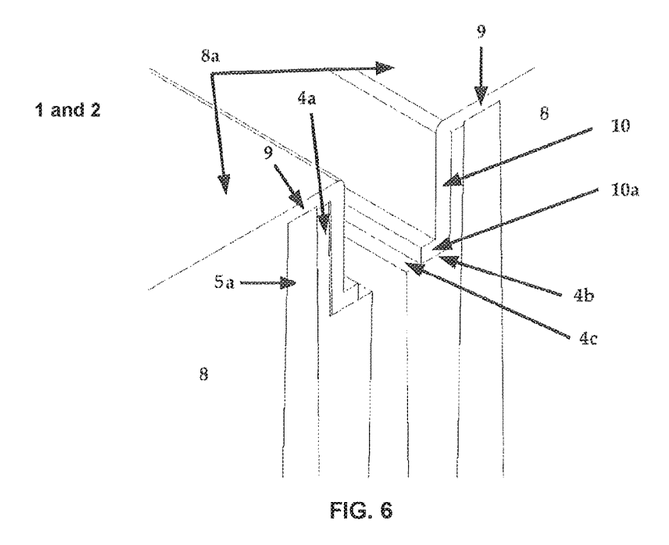
FIG. 6 is a perspective view from above of the elastic elements inserted into the button bodies.

As shown in FIGS. 2 and 6, the button body 1 (as one of the components of the button of the present invention) comprises a vertically extending rigid outer wall 4 the outer side of which has an inwardly offset outer profile edge 4a in the upper area. A horizontally extending pedestal 4b forms the transition between the outer profile edge 4a and the remaining part of the outer wall 4. The button body serving as a guiding element forms a lightproof chamber 5 with a bottom opening and a top opening. A front plate or the like of the device in which the button of the present invention is used is inserted above the pedestal 4b, as described below in connection with the elastic button element 2. The button body 1 can include vertically downwardly extending positioning nipples 7 on the rim along the bottom opening. The button body 1 can be made of polycarbonate, for instance.

Figure 3:
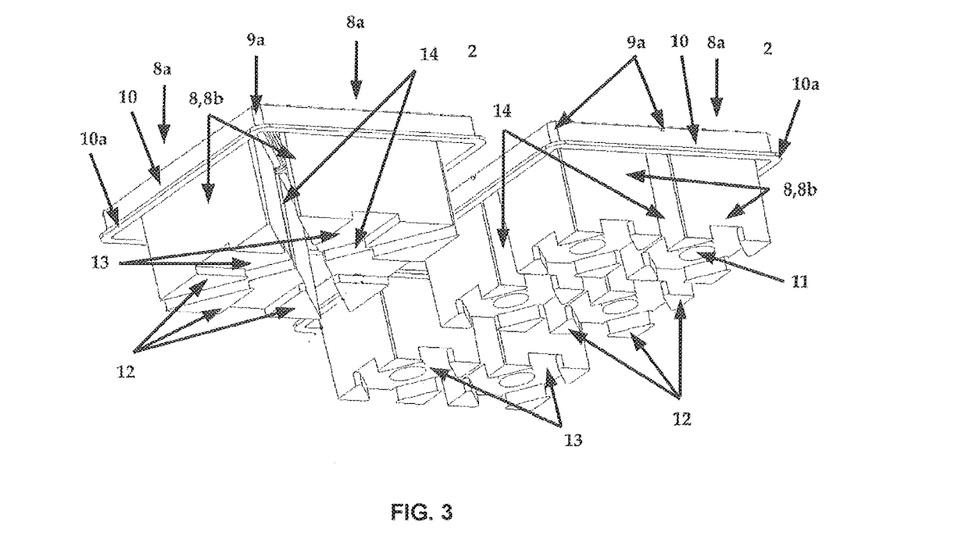
FIG. 3 is a perspective view from below of elastic button elements of the present invention.
Figure 4:
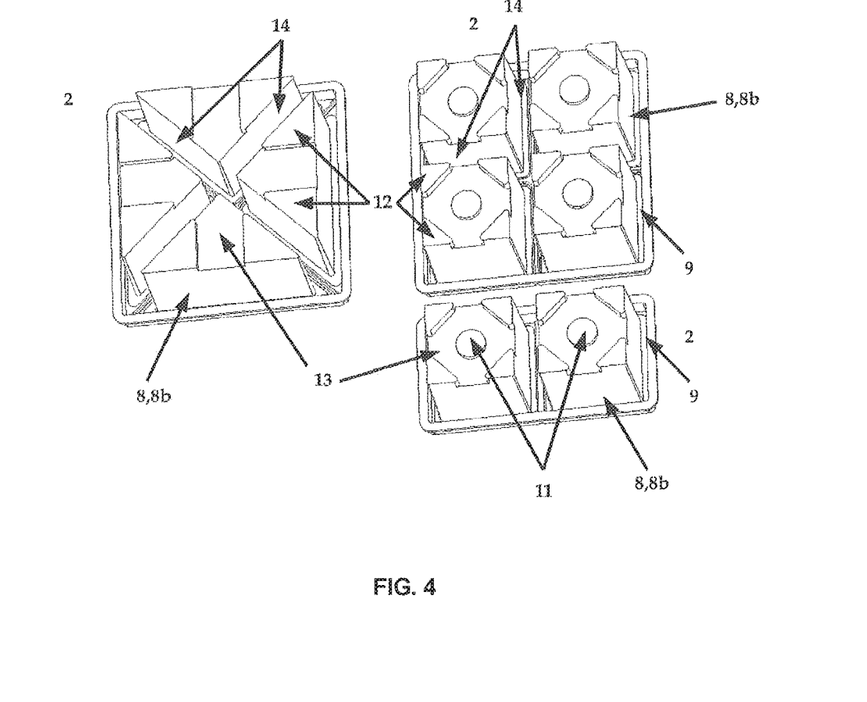
FIG. 4 is another perspective view from below of elastic button elements of the present invention.
Figure 5:
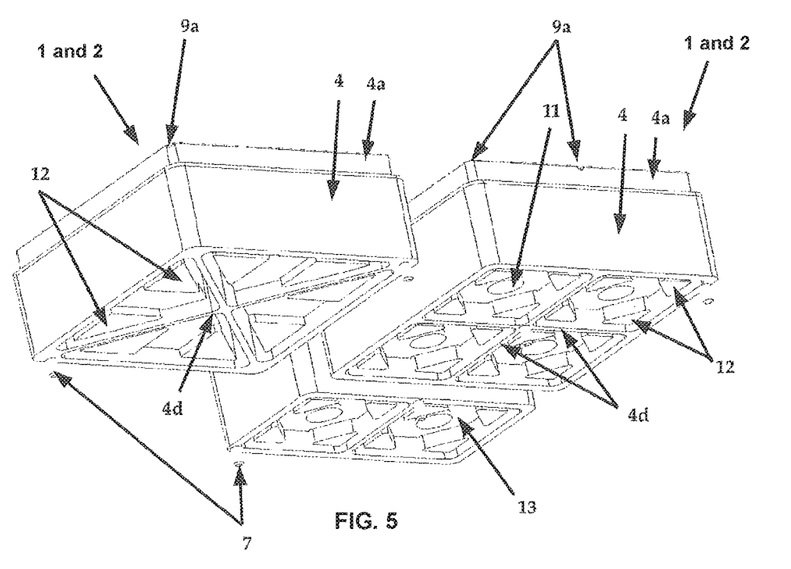
FIG. 5 is a perspective view from below of elastic elements inserted into the button bodies.
Figure 7:
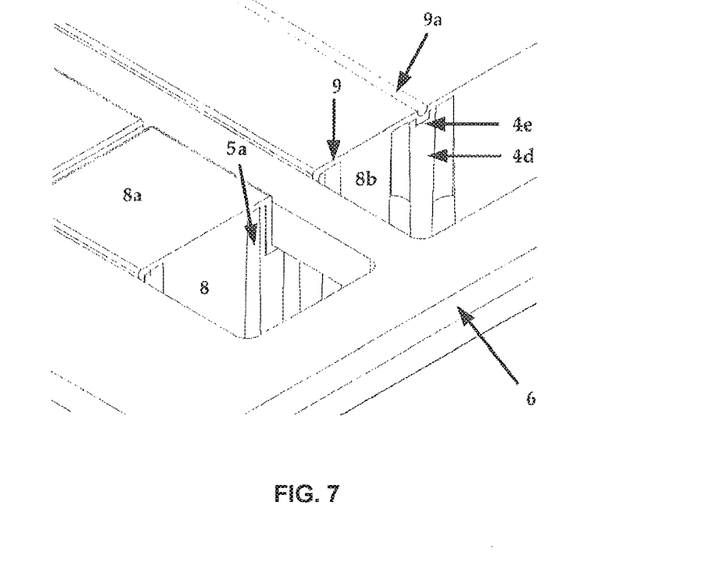
FIG. 7 is a perspective view from above of body buttons furnished with elastic button elements inserted into a front plate.
Figure 9:
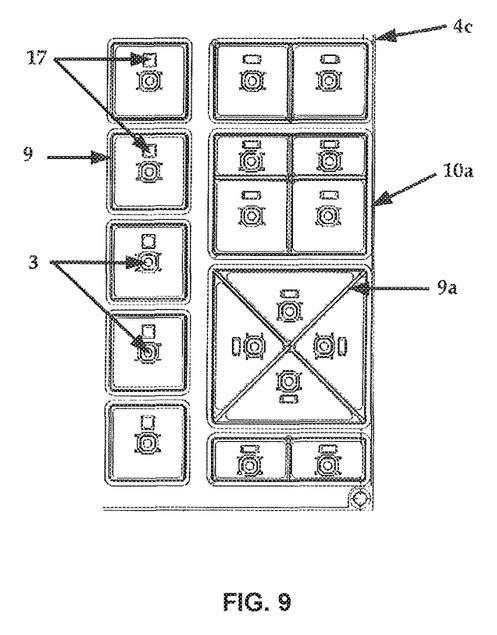
FIG. 9 is a phantom view from above of buttons of the present invention inserted into a mounting plate.

The elastic button element 2 (as a further component of the button of the present invention) is shown separately in FIGS. 3 and 4 and in FIG. 5-7 as already molded into the button body 1 and can be made, e.g., of silicone or another elastic material. The process of molding the elastic button elements 2 into the button body 1 will be described below. The elastic button element 2 has a massive shaft 8 which is formed in such a way that its outer contour corresponds to the form of the chamber 5 inside the button body 1, and upon the molding into the button body 1 it is enclosed therein while being spaced from its outer wall 4 by an air gap 5a. The upper part of the elastic button element 2 essentially forms an actuating surface 8a which on its outer rim is surrounded by a movement crimp 9 above the air gap 5a and which is designed in such a way that the elastic material in the area of the movement crimp is relatively thin in a vertical direction (for the air gap 5a and the movement crimp 9 cf., in particular, FIGS. 6 and 7). At the circumference of the movement crimp 9 the elastic button element 2 firstly extends further horizontally above the top rim of the outer wall 4 of the button body 1 and then downwardly again and ends in a horizontally extending protrusion 10a which, upon molding the elastic button element 2 into the button body 1, rests on the pedestal 4b of the button body 1, covering it at least partially upwardly such that the outer part 4c of the pedestal remains free in case of only partial coverage by the protrusion 10a. In this way, a profile area 10 is created inside the elastic button element 2 the horizontally extended portion of which rests on top of the outer wall 4 of the button body 1, the downwardly extending portion of which rests on the outer profile edge 4a of the button body 1 and the protrusion 10a of which rests on the pedestal 4b of the button body 1, covering it at least partially (cf., in particular, FIGS. 6 and 7)—upon molding the elastic button element 2 into the button body 1 (which will be described below), both parts are adhering to one another in these areas. Since the movement crimp 9 is located directly at the upper rim of the button of the present invention, there is the advantage of having the elastic button element 2 enclosed in the button body 1, while being free to move outwards. The protrusion 10a ensures that the front plate 6 of the device does not rest on the rigid button body 1 after the molding but on the elastic protrusion 10a of the elastic button element 2, whereby a twofold achievement is made: Firstly, due to the elasticity of the protrusion 10a, there is a better—tighter—abutment of the front plate 6 on the button; secondly, the adherence of the elastic button element 2 to the button body 1 is further supported. FIG. 9 shows a phantom view from above through the buttons of the present invention on the mounting plate 15. Additionally, it can be obtained from FIG. 4 that the elastic button element 2 at the bottom of the shaft 8 can include an actuating protrusion 11 which is aligned in such a way that it actuates the switch 3 at the moment of actuating the button—i.e., while pressing down its actuating surface 8a (switch 3 and mounting plate 15 will be described in greater detail below). In case that there is no designated actuating element, switch 3 is directly actuated by the bottom part of the shaft 8. In its idle position the actuating protrusion 11 can be located above the switch 3 within a distance of 0-0.1 mm. As the elastic button element 2 adheres to specific areas on the button body 1, which is further supported by the inserted front plate 6, the movement crimp 9 is expanded due to its limited material thickness and its elasticity when the actuating surface 8*a* is pushed down such that the shaft 8 of the elastic button element 2 which is separated from the inside of the chamber 5 of the button body 1 by the air gap 5*a* can move downwards. As it is enclosed by the button body 1, the shaft 8 can move downwardly almost completely tilt- and spin-free. At the same time, the movement crimp 9 is stable enough to move the shaft 8 with its actuating surface 8*a* back into its original position, namely the idle position, due to the energy stored in the elastic material.

To ensure an even more evenly downward movement of the shaft 8 when pushing down the actuating surface 8*a*, the shaft can include movement restrictors 12 on the bottom side which are aligned in such a way that they rest on or at least almost touch the mounting plate 15. Due to the movement restrictors 12, the downward movement of the shaft occurs evenly downwardly during the actuation of the button such that tilting or spinning of the shaft is further minimized. Furthermore, the movement restrictors 12 can include light guides in form of openings or cut-outs 13 to enable an illumination which is described below.

Figure 8:
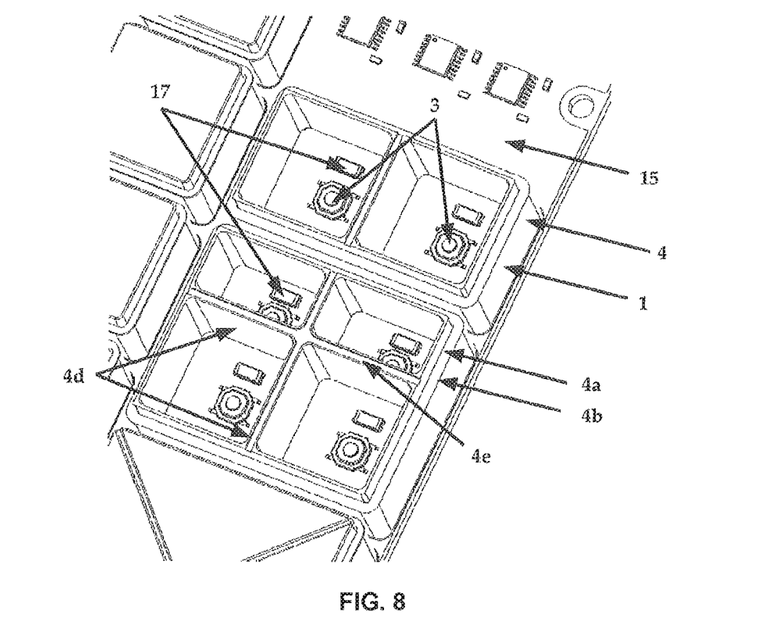
FIG. 8 is a perspective view from above of button bodies of the present invention inserted into a mounting plate.

The switch 3 (as the last component of the button of the present invention) is arranged on a mounting plate, for instance a circuit board 15 (PCB) which is shown in FIGS. 1 and 8 and onto which the button body is fixed. This can be achieved, for example, through indentations 16 in the mounting plate 15 which can be engaged by the positioning nipples 7 that were mentioned above in connection with the button body 1 such that the button body 1 can be arranged on the mounting plate 15 spin-locked and precisely positioned such that a shift of the button body 1 on the mounting plate 15 is prevented. This kind of fixation notably simplifies the installation of many buttons on the mounting plate 15, while a circuit board can be used for buttons with different designs.

Furthermore, the mounting plate 15 can be provided with illumination elements 17 such as LEDs for the buttons, wherein the illumination can be Single Color, Dual Color or Multi-Color in the RGB color space. Due to the above mentioned lightproof chamber 5 of the button body 1 resting at its bottom end on the mounting plate 15 and being tightly enclosed at its top end by the profile area 10 of the elastic button element 2, it is possible to illuminate different buttons of the present invention with individual colors without a light diffusion between the different buttons. Moreover, images, characters, texts or icons can be added on the surface of a button, e.g. by means of laser engravings.

Manufacturing and assembly of the button of the present invention are performed as follows. Firstly, the button bodies 1 are molded from a rigid material, e.g. polycarbonate. Subsequently, the elastic button elements 2 made of silicone, for instance, are molded into the button bodies 1 in a molding tool. The molding tool is provided with protrusions designed in such a way that, due to the protrusions, the respective massive middle shaft 8 of the elastic button elements 2 is separated from the inner sides of the respective chamber 5 of the guiding element during the molding process by the air gap 5*a* which, in turn, is confined at its top by the movement crimp 9. During molding the elastic button element 2 into the button body 1, the profile area 10 located at the circumference of the movement crimp 9, which first extends horizontally outwardly, then downwards and then ends in the horizontally outwardly extending protrusion 10*a*, is adhesively connected to the button body as the horizontally outwardly extending portion of the profile area 10 adheres to the outer wall 4, the downwardly extending portion of the profile area 10 adheres to the outside of the outer profile edge 4*a* and the protrusion 10*a* at least partially covers pedestal 4*b* and adheres thereto. In this way, the guiding elements 1 and the button elements 2 are united to adhering button parts 1, 2, while the massive middle shaft 8 is movable due to the air gap 5*a* inside the chamber 5. In case of only partial coverage by the protrusion 10*a*, the uncovered part 4*c* of the pedestal 4*b* can additionally be used to fix the button bodies 1 in the molding tool. Afterwards, the button parts 1, 2 are extracted from the molding tool and fixed onto the mounting plate 15—e.g. by using positioning nipples 7 and indentations 16—which has switches 3 that can by actuated by the button parts 1, 2. Subsequently, the front plate 6 of the device in which the buttons of the present invention are used can be installed by placing it onto the protrusions 10*a* of the elastic button elements 2 which at least partially cover the pedestals 4*b* of the button bodies 1.

The generally desired button click as an acoustic and haptic experience is audible and tangible and is essentially caused by the mechanics of switch 3 on the circuit board 15. However, the width and thickness of the optional actuating protrusion 11, the surface area of the switch 3 and the hardness and/or elasticity of the material of the elastic button element 2 affect the tactile feeling when pushing down the button of the present invention, while the pressure feeling and the clicking sound in the range from "damp" to "crunchy" are for the most part determined by the thickness and width of the movement crimp 9, whereas the pressure feeling in the range from "soft" to "hard" is for the most part determined by the hardness of the material of the elastic button element 2 and the dimension and/or shaping of the actuating protrusion 11. With respect to the present invention, the click haptics are neither damped by the elastic button element 2 and nor unduly transmitted through surrounding casing elements because the elastic button element 2, as explained above, is only moved by movement of the thin movement crimp 9 relative to the button body 1 which acts as a structure-borne noise barrier vis-á-vis the outer parts of the button construction and other casing elements such as the front plate 6, for instance. At the same time, click and lifting of the switch 3 are transmitted to the actuating surface 8*a* of the elastic button element 2 without hindrance. This leads to a pleasant click sound and a tangible surface movement of the pushed-down button. With regards to the acoustic and haptic perception of the button click, the following parameters have proved adequate when silicone is used for the elastic button element 2:

Thickness of movement crimp: 0.3 mm-0.5 mm (preferably: 0.4 mm)

Silicone hardness: 40-60 Shore-A (preferably: 50 Shore-A)

Switch actuation force: 1-2 N (preferably: 1.6 N)

In another embodiment each button of the present invention is comprised of several single buttons and, thus, forms a multi-button. The multi-button has all of the above mentioned features of the (single) button of the present invention, but is defined by further features resulting in additional functionality. All of these features are physically located within the chamber 5. FIG. 1-9 that were used to describe the (single) button also show the embodiment of the multi-button and will therefore be partly used for the description which adopts the same order as above—i.e., button body, elastic button element, switch.

In case of the multi-button, the chamber 5 which is enclosed by the outer wall 4 of the button body 1 has additional inner walls 4d separating the chamber into single chambers in a lightproof manner. The inner walls 4d can—instead of the outer profile edge 4a and pedestal 4b of the outer wall 4—have an indentation 4e in their top edge. Like the outer wall 4 the inner walls 4d can have positioning nipples 7 on their bottom side.

Corresponding to the features of button body 1 above, the elastic button element 2 of the multi-button has recesses 14 in its shaft 8 receiving the inner walls 4d of the button body—which are separated therefrom again by air gaps—and separating shaft 8 into partial shafts 8b, wherein the material thickness of the elastic button element 2 above the recesses 14 corresponds to the material thickness of the movement crimp 9 at the outer circumference of the (multi-) button. Corresponding to the optional indentations 4e in the top edges of the inner walls 4d, the portion of the material of the button element 2 located above the recesses 14 can have a profile indentation 9a following the indentation 4e in the inner wall 4d. It therefore engages the indentation 4e, on the one hand, and forms a groove on the surface of the elastic button element 2, on the other hand. In this way, the actuation of one part of the button does not affect the other part(s) of the button, as no shear forces are transmitted. Furthermore, a visual separation of the button parts is achieved. As mentioned above, the material thickness of the portion above the recesses 14 (and therefore also above the inner walls 4d) corresponds to the thickness of the movement crimp 9. In these areas of the elastic button element 2—and hence between the partial buttons of the multi-button—it is therefore sufficiently thin and expandable to execute the downward movement of each part of the shaft 8 while pressing down the respective actuating surface 8a and to move it back in the original position after the impact—without affecting the other part(s) of the button.

Like the single button, the elastic body element 2 of the multi-button can include an actuating protrusion 11 and/or movement restrictors 12 which can be provided with illumination cut-outs 13 on the bottom side of each partial shaft.

The single as well as the multi-button of the present invention are seamless because the movement crimp 9 is located on top of the button and tightly encloses the air gap 5a located underneath outwardly, while the same applies to the air gaps between the inner walls 4d and the recesses 14 of the multi-button. In this way, the problems of the gaps of conventional buttons described above—for instance dirt build-up and total actuational failure or light diffusion—are avoided. The button of the present invention can be used in a number of devices, such as computers, musical instruments etc.

The invention claimed is:

1. Seamless button, comprising a guiding element (1), a movable actuating element (2) and a switch (3) which is located on a mounting plate (15),
characterized in that
the guiding element (1) includes a rigid outer wall (4) that defines an enclosure having an inner chamber (5) with a bottom opening and a top opening, wherein the rigid outer wall (4) is provided, on an outer side in an upper area, with an inwardly offset outer profile edge (4a) and with a pedestal (4b) extending horizontally and forming the transition between the upper outer profile edge (4a) and a remaining part of the outer wall (4);
the movable actuating element (2) is an elastic button element (2) made of elastic material and provided with a massive middle shaft (8) spaced from inner walls of the chamber (5) by an air gap (5a) and having a planar upper actuating surface (8a) that extends from a first plane that is perpendicular to the upper actuating surface (8a) and that is defined by the upper outer profile edge (4a) of the outer side of one portion of the rigid outer wall (4) to a second plane that is parallel to the first plane and that is defined by the upper outer profile edge (4a) of the outer side of an opposed portion of the rigid outer wall (4), the planar upper actuating surface (8a) having a movement crimp (9) surrounding an outer rim of the actuating surface (8a) above the air gap (5a), wherein the movement crimp (9) is designed in such a way that the elastic material in the area of the movement crimp (9) is relatively thin in a vertical direction and wherein the movement crimp (9) is located directly at an upper rim of the button and enclosing the air gap (5a) located underneath tightly outwardly such that the button is seamless, and with a profile area (10) arranged at an outer circumference of the movement crimp (9) and extending firstly horizontally outwardly and then downwardly and ending in a horizontally outwardly extending protrusion (10a);
wherein the horizontally outwardly extending portion of the profile area (10) rests on top of the outer wall (4), the downwardly extending portion of the profile area (10) rests on the outside of the outer profile edge (4a) and the protrusion (10a) rests on the pedestal (4b) covering the pedestal (4b) at least partially.

2. Button according to claim 1, characterized in that the guiding element (1) is made of polycarbonate.

3. Button according to claim 1, characterized in that the elastic button element (2) is made of silicone.

4. Button according to claim 1, characterized in that the protrusion (10a) covers the pedestal (4b) only partially such that a part (4c) of the pedestal (4b) remains uncovered.

5. Button according to claim 1, characterized in that the outer wall (4) is provided on a bottom side thereof with positioning nipples (7) engaging indentations (16) on the mounting plate (15).

6. Button according to claim 1, characterized in that the mounting plate (15) is provided with illumination elements (17).

7. Button according to claim 1, characterized in that the shaft (8) is provided with an actuating protrusion (11) for actuating the switch (3).

8. Button according to claim 1, characterized in that the shaft (8) is provided with movement restrictors (12) resting on the mounting plate (15) or nearly touching the mounting plate (15).

9. Button according to claim 8, characterized in that the movement restrictors (12) are provided with illumination cut-outs (13).

10. Button according to claim 1, characterized in that the guiding element (1) is provided with inner walls (4d) and in that the elastic button element (2) is provided with recesses (14) for receiving the inner walls (4d) that are separated therefrom by the air gap (5a) such that a multi-button with partial shafts (8b) is formed.

11. Button according to claim 10, characterized in that the inner walls (4d) each are provided with an indentation (4e) in their top edges and in that the elastic button element (2) in the portion above the recesses (14) is provided with profile indentations (9a) each of which follows the indentation (4e) such that each profile indentation (9a) engages the indentation (4e), forming a groove on the top side of the elastic button element (2), wherein the material thickness of the elastic button element (2) above the recesses (14) corresponds to the material thickness of the movement crimp (9).

12. Button according to claim 10, characterized in that each partial shaft (8b) has an actuating protrusion (11).

13. Button according to claim 10, characterized in that each partial shaft (8b) is provided with movement restrictors (12) resting on the mounting plate (15) or nearly touching the mounting plate (15).

14. Button according to claim 13, characterized in that the movement restrictors (12) are provided with illumination cut-outs (13).

15. Button according to claim 1, characterized in that the planar upper actuating surface (8a) includes one or more grooves.

\* \* \* \* \*